Patented May 2, 1950

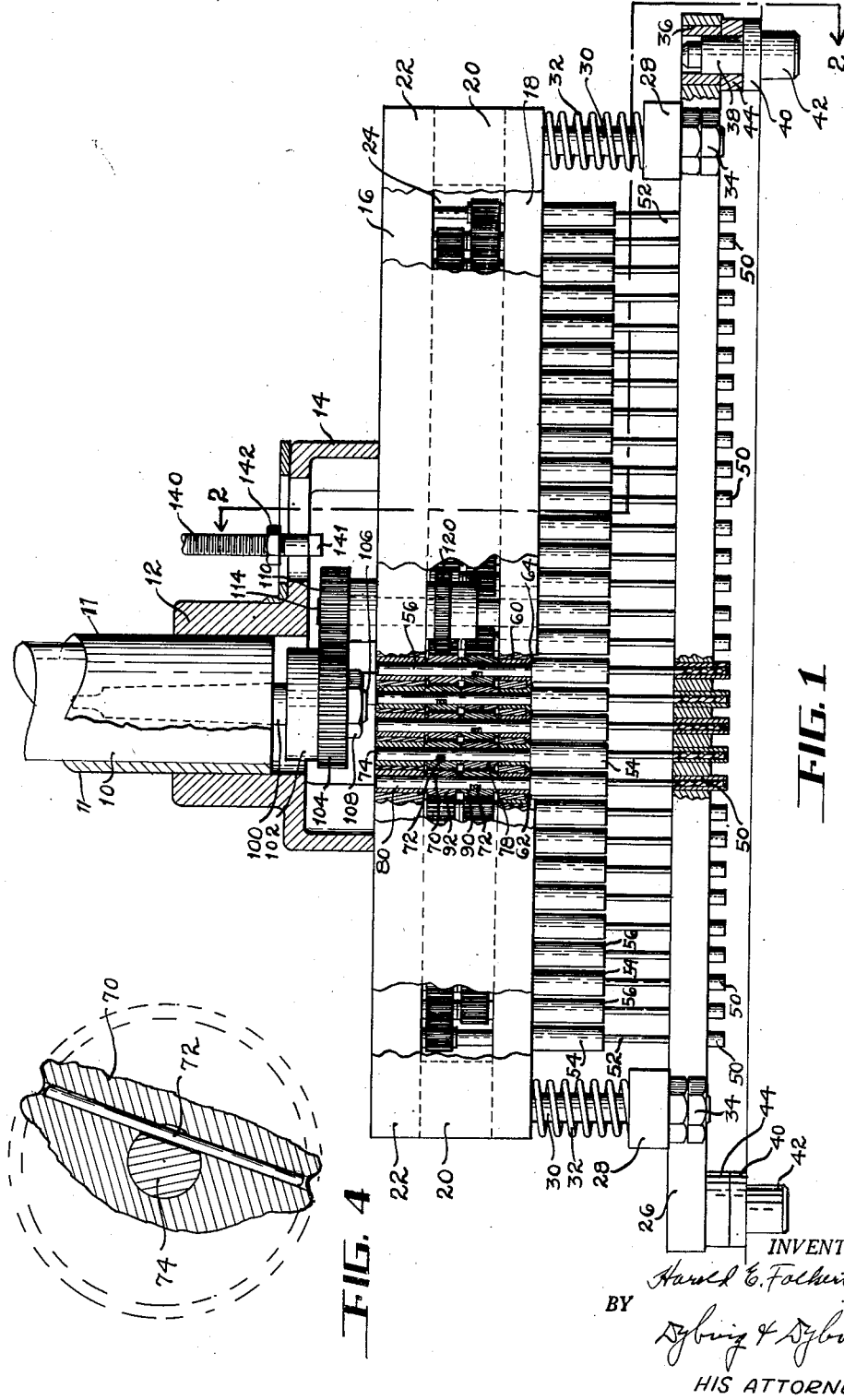

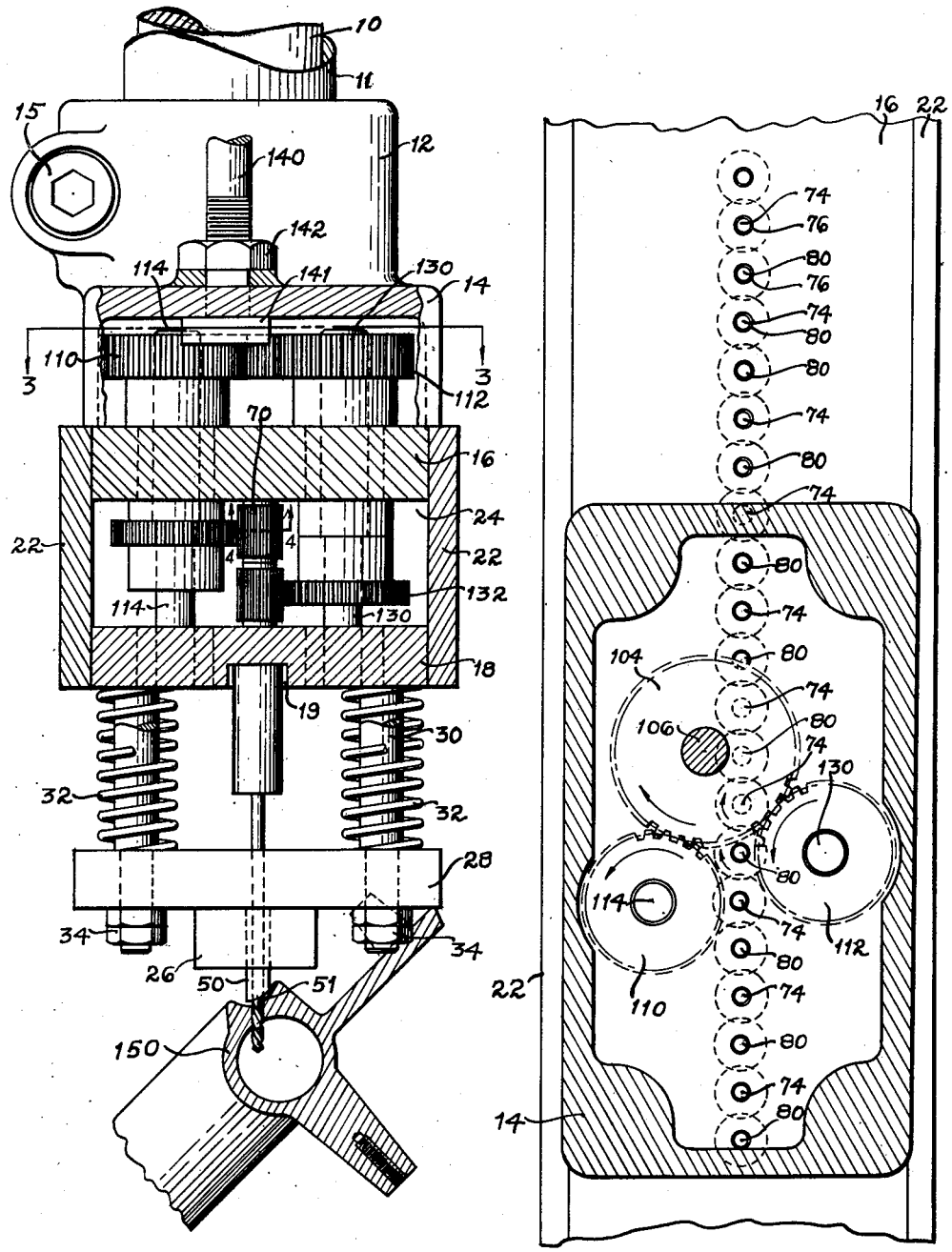

2,506,202

UNITED STATES PATENT OFFICE 2,506,202

MULTIPLE CLOSE CENTERED GEAR HEAD

Harold E. Folkerth, Sr., Dayton, Ohio

Application August 13, 1948, Serial No. 44,136

7 Claims. (Cl. 74—665)

This invention relates to a drill head and more particularly to a multiple chuck drill head.

Multiple chuck drill heads for drilling a plurality of holes are old providing the holes are spaced sufficiently far apart. For example, in the manufacture of burners for gas fire stoves where the holes are very close together, in the past it has been common practice either to provide a chuck for first drilling every other hole along a line, then resetting for a second drilling operation, so as to drill the remaining holes in the line, or, in many stove manufacturing plants, the holes are drilled one at a time. This means repeated operations and furthermore, this procedure is quite susceptible to errors, in that if the holes are off center, some of the holes will be too close together and others spaced too far apart, which is not conducive to optimum efficiency of the burner.

An object of this invention is to provide a multiple chuck wherein the drills are so spaced that only one operation needs to be performed, instead of two or more operations in the past.

Another object of this invention is to provide a mechanism for locating a plurality of spindles in close proximity to each other, all rotating in the same direction, by means of two series or tiers of gears, one series of gears driving alternate spindles, the other series of gears driving the remaining spindles, idlers between the gears of one series rotating about the spindles driven by the other series of gears.

Other objects and advantages reside in the construction of parts, the combination thereof and the mode of operation, as will become more apparent from the following description.

In the drawings, Figure 1 is a front elevational view of a chuck for a drill head with parts broken away and parts shown in section.

Figure 2 is a transverse, cross sectional view, taken substantially on the line 2—2 of Figure 1.

Figure 3 is a horizontal cross sectional view taken substantially on the line 3—3 of Figure 2.

Figure 4 is an enlarged, fragmentary, sectional view taken substantially on the line 4—4 of Figure 2.

Referring to the drawings, the reference character 10 indicates a spindle or quill of a drill head driven from any suitable source of power. This spindle extends through a non-rotatably mounted tubular frame member 11. A split collar-like portion 12 is clamped to the lower end of the tubular member 11 by means of a suitable screw 15. The split collar-like portion 12 forms a part of a gear housing 14 fixedly attached to a horizontal bearing plate 16. A second bearing plate 18 is mounted below the bearing plate 16, the two plates being held in fixed spaced relation by a pair of spacers or bearers 20. The bearing plate 18 is provided with a longitudinally disposed slot 19 in the under side thereof, as shown in Figure 2. The bearing plates 16 and 18, together with the spacers 20, cooperate with a pair of plates 22, one on either side of the plates 16 and 18, to form a spindle gear compartment 24. A third bearing plate or bearing bar 26 is located in spaced relation from the lower bearing plate 18 and is supported upon a pair of cross bars 28, one near either end. The cross bars 28 are held in position by means of a plurality of bolts 30, having sliding engagement with the cross bars 28, and fixedly mounted in the bearing plate 18. Cross bars 28 are at all times biased downwardly, as viewed in Figure 2, by compression springs 32, positioned between the bearing plate 18 and the cross bars 28. The downward movement of the cross bars 28, as viewed in Figures 1 and 2, is limited by the lock nuts 34.

As may best be seen by referring to Figure 1, the ends of the bearing plate 26 have press fitted therein suitable bushings 36, one in either end, each having mounted therein a spindle 38, provided with a collar 40, and the downwardly projecting member 42 seated in a suitable aperture in a support not shown.

In order to provide a rigid support for the ends of the bearing plate 26, a collar 44 is positioned between the bearing plate 26 and the collar 40. The structure described thus far constitutes the main frame structure for the multiple chuck assembly. The operating parts of the chuck assembly will now be described.

The bearing bar 26 is provided with a plurality of equally spaced apertures, each supporting a bearing 50 press fitted into position. The bearings 50 project below the bearing bar 26 and provide bearings for the drills 52. The contour of the ends 51 of the bearings 50 is shaped similar to the contour of the work. The drills 52 are mounted in drill spindles 54 and 56. The drill spindles 54 and 56 are journalled in bearings 60 mounted in the bearing plate 18. Each bearing 60 is provided with a flange 62 seated in an enlarged recess in the bearing plate 18, so that the flanges 62 provide end thrust bearings engaging the shoulders 64 of the enlarged portion of the spindles 54 and 56 respectively.

As may best be seen by referring to Figures 1 and 4, gears 70 are non-rotatably mounted on the reduced portions 74 of the spindles 54 by means of a key 72 extending through the gears 70 and seated in a suitable notch in the side of portion 74. The upper ends of the spindle portions 74 are journalled in bearings 76, press fitted into suitable apertures in the bearing plate 16. It is to be noted that the gears 70 are keyed to alternate spindles. Idle gears are rotatably mounted on the spindle portions 74 below the drive gears 70, as viewed in Figure 1. The spindle portions 74 immediately below the drive gears 70 function as pivotal mountings for the idle gears.

The reduced portions 80 of the spindles 56 are mounted in bearings identical to the bearings supporting the reduced portions 74 of the spindles 54.

As may best be seen by referring to Figure 1, the reduced portions 80 of the spindles 56 are provided with gears 90, non-rotatably mounted thereon by means of keys 72 extending through the gears 90 and seated in a suitable notch in the reduced portions 80 in a manner identical to the mounting of the gears upon the reduced portions 74. Idle gears 92 are mounted on the reduced portions 80 above the gears 90. The reduced portions 80 function as pivotal mountings for the idle gears 92. The gears 90 mesh with the idle gears 78 on the spindles 54. Thus, two tiers of gears are provided. The gears 70 mesh with the idle gears 92, so that when one of the gears 70 is driven, all of the gears 70 will be driven in the same direction, causing the spindles 54 to rotate in the same direction to actuate the drills 52 mounted therein. Likewise, if one of the gears 90 is driven, all of the spindles 56 will be driven in the same direction. Mechanism has been provided for driving the gears 70 and the gears 90 in the same direction, which mechanism will now be described.

A shank 100 is inserted into the tapered bore in the drill press spindle 10. The contour of the shank 100 is substantially identical to shanks found on conventional drills now on the market. The shank 100 is provided with an integral collar 102 providing a seat or shoulder against which a gear 104 is seated. The gear 104 is mounted upon a reduced portion 106 of the shank 100 and is locked in position by means of a nut 108. The gear 104 is preferably provided with threads, so that the gear is tightened upon the reduced portion 106 whenever the spindle 10 rotates in a direction used in drilling.

The gear 104 meshes with a pair of gears 110 and 112. These gears are mounted in offset relation with respect to the longitudinal axis of the bearing plates 16 and 18. So is the spindle of the drill head. The gear 110 is fixedly mounted upon a shaft 114 journalled in suitable bearings in the bearing plate 16 and in suitable bearings in the bearing plate 18. A gear 120 is fixedly attached to the shaft 114 and located between the bearing plates 16 and 18. The gear 120 meshes with one of the gears 70, so that as the spindle 10 rotates, the gear 104 drives the gear 110, which in turn drives the gear 120 through the shaft 114, to thereby rotate all of the gears 70 and the idle gears 92, so as to actuate all of the spindles 54 and the drills carried thereby.

In a similar manner, the gear 112, fixedly mounted upon a shaft 130, has fixedly mounted thereon a gear 132 that meshes with one of the gears 90, to thereby drive all of the spindles 56 in the same direction in which the spindles 54 are driven.

In order to cause the multiple chuck assembly to move downwardly or upwardly, as the case may be, with the mechanism reciprocating the tubular member 11 and the spindle 10, a suitable bolt or rod 140, having its head 141 (best seen in Figure 2) mounted in engagement with the inner surface of member 14 and locked in position by a nut 142, is connected to the mechanism, not shown, for reciprocating the tubular member 11, so as to actuate the multiple chuck and all of the drills mounted thereon in unison, toward and away from the work.

As may best be seen by referring to Figure 2, a cross sectional view has been shown of a burner 150 that is mounted in position for drilling operation. This burner is preferably mounted in a suitable jig, not shown. When the burner 150 has been placed in proper position in the jig, the drill head spindle 10 and the multiple chuck assembly are actuated downwardly, the drills 52 extending through the bearings 50, the bearings 50 resting against the work piece, to drill all of the holes in unison. During the drilling operation, the springs 32 are gradually compressed. This assembly limits the distance between the center of the drills to the pitch diameter of the gears 70 and 90. Due to the fact that all the gears and all the idlers are of the same diameter and due to the fact that the idlers are mounted upon adjoining spindles, the minimum distance between drills or holes is obtained by a minimum number of gears and idlers.

The multiple chuck assembly disclosed herein may be used as an attachment for a conventional drill press, in which event the tubular member 11 would constitute a part of the drill press. The multiple chuck assembly may also be incorporated into a special machine used in drilling the holes.

Furthermore, the drills need not necessarily be arranged in a straight row. They could be arranged so as to drill the holes along any desirable path. The holes could be drilled in a circular path, an oval path, a rectangular path or any other suitable configuration.

Instead of using an electric motor, a hydraulic motor could be used. This would be desirable in places where large power and light weight is desirable as far as the parts carried by the multiple chuck assembly are concerned.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A multiple chuck attachment for a drill head including a frame, a plurality of equally spaced spindles mounted for rotation in the frame, a first tier of gears, alternate gears of said tier being fixedly attached to the alternate spindles, the remaining gears of said tier idling on the other spindles, a second tier of gears, alternate gears of said second tier being fixedly attached to said other spindles in offset relation from the idle gears mounted thereon, said second tier of gears including idle gears mounted upon the first set of spindles and meshing with the gears fixedly attached to said other spindles, means for rotating one of the gears in the first tier to thereby drive all of the gears in the first tier, and another means for rotating one of the gears in the second tier to thereby drive all of the gears in said second tier, said rotating means rotating the gears fixedly attached to the spindles in the same direction and at the same speed.

2. A multiple chuck attachment for a drill head including a frame, a plurality of equally spaced spindles mounted for rotation in the frame, a first tier of gears, alternate gears of said tier being fixedly attached to the alternate spindles, the remaining gears of said tier idling on the other spindles, a second tier of gears, alternate gears of said second tier being keyed to said other spindles in offset relation from the idle gears mounted thereon, said second tier of gears including idle gears mounted upon the first set of spindles and meshing with the gears fixedly attached to said other spindles, said frame having a bearing portion positioned on the spindle of the drill press, a gear driven by the drill press spindle, a pair of gears arranged in offset relation with respect to each other and meshing with the gear driven by the drill press spindle, a pair of shafts, one attached to each of the offset gears, a pair of drive gears, one for each of the shafts, one of the drive gears meshing with a gear of one tier of gears and the other drive gear meshing with a gear of the other tier of gears so as to drive all of the spindles.

3. A multiple chuck attachment for a drill head including a frame, a plurality of equally spaced spindles mounted for rotation in the frame, a first tier of gears, alternate gears of said tier being fixedly attached to the alternate spindles, the remaining gears of each tier idling on the other spindles, a second tier of gears, alternate gears of said second tier being keyed to said other spindles in offset relation from the idle gears mounted thereon, said second tier of gears including idle gears mounted upon the first set of spindles and meshing with the gears fixedly attached to said other spindles, a gear driven by the drill press spindle, a pair of gears arranged in offset relation with respect to each other and meshing with the gear driven by the drill press spindle, one of said offset gears having the axis of rotation located on one side of the tiers of gears and the other offset gear having its axis of rotation located upon the opposite side of the tiers of gears, a pair of shafts, one attached to each of the offset gears, a pair of drive gears, one for each of the shafts, one of the drive gears meshing with a gear of one tier of gears and the other drive gear meshing with a gear of the other tier of gears, to thereby drive the spindles of the multiple chuck in the same direction.

4. A multiple chuck for a drill head including a frame, a plurality of equally spaced spindles mounted for rotation in the frame, a first tier of gears, said first tier of gears including gears fixedly attached to alternate spindles, a plurality of pivotal mountings, the remaining gears of said tier idling upon the pivotal mountings and meshing with adjacent gears attached to the spindles, a second tier of gears including gears fixedly attached to the other spindles, a plurality of pivotal mountings, the remaining gears of said tier idling upon said pivotal mountings and meshing with two adjacent gears fixedly attached to said other spindles, means for rotating one of the gears in the first tier to thereby drive all of the gears in the first tier, and another means for rotating one of the gears in the second tier to thereby drive all of the gears in said second tier, said rotating means rotating the gears fixedly attached to the spindles in the same direction and at the same speed.

5. A multiple chuck for a drill head including a frame, a plurality of equally spaced spindles mounted for rotation in the frame, a first tier of gears, said first tier of gears including gears fixedly attached to alternate spindles, a plurality of pivotal mountings, the remaining gears of said tier idling upon the pivotal mountings and meshing with adjacent gears attached to the spindles, a second tier of gears including gears fixedly attached to the other spindles, a plurality of pivotal mountings, the remaining gears of said tier idling upon said pivotal mountings and meshing with two adjacent gears fixedly attached to said other spindles, said frame having a bearing portion positioned on the spindle of the drill press, a gear driven by the drill press spindle, a pair of gears arranged in offset relation with respect to each other and meshing with the gear driven by the drill press spindle, a pair of shafts, one attached to each of the offset gears, a pair of drive gears, one for each of the shafts, one of the drive gears meshing with a gear of one tier of gears and the other drive gear meshing with a gear of the other tier of gears so as to drive all of the spindles.

6. A multiple chuck for a drill head including a frame, a plurality of equally spaced spindles mounted for rotation in the frame, a first tier of gears, said first tier of gears including gears fixedly attached to alternate spindles, a plurality of pivotal mountings, the remaining gears of said tier idling upon the pivotal mountings and meshing with adjacent gears attached to the spindles, a second tier of gears including gears fixedly attached to the other spindles, a plurality of pivotal mountings, the remaining gears of said tier idling upon said pivotal mountings and meshing with two adjacent gears fixedly attached to said other spindles, a gear driven by the drill press spindle, a pair of gears arranged in offset relation with respect to each other and meshing with the gear driven by the drill press spindle, one of said offset gears having the axis of rotation located on one side of the tiers of gears and the other offset gear having its axis of rotation located upon the opposite side of the tiers of gears, a pair of shafts, one attached to each of the offset gears, a pair of drive gears, one for each of the shafts, one of the drive gears meshing with a gear of one tier of gears and the other drive gear meshing with a gear of the other tier of gears, to thereby drive the spindles of the multiple chuck in the same direction.

7. A drilling machine for simultaneously drilling a plurality of holes in a work piece, said drilling machine including a frame, a plurality of spindles mounted for rotation in the frame, a first tier of gears, said first tier of gears including gears fixedly attached to some of the spindles, there being spindles located between the gears which are fixedly attached to some of the spindles, and idle gears meshing with at least two adjacent gears so that upon one of the gears being driven all of the gears are driven, a second tier of gears, said second tier of gears including gears fixedly attached to the spindles between the fixed gears of the first tier of gears, and idle gears meshing with at least two adjacent gears of the second tier, so that if one of the gears of the second tier of gears is driven all of the gears of the second tier are driven.

HAROLD E. FOLKERTH, Sr.

REFERENCES CITED

The following references are of record in the file of this patent:

UNITED STATES PATENTS

| Number | Name | Date |
|---|---|---|
| 1,474,939 | Nelson | Nov. 20, 1923 |